(12) United States Patent
Flemin

(10) Patent No.: US 8,790,008 B2
(45) Date of Patent: Jul. 29, 2014

(54) DEVICE FOR MEASURING THE TEMPERATURE OF A SUBSTRATE

(75) Inventor: Christian Flemin, Dremil Lafage (FR)

(73) Assignee: Astrium SAS, Paris (FR)

( * ) Notice: Subject to any disclaimer, the term of this patent is extended or adjusted under 35 U.S.C. 154(b) by 292 days.

(21) Appl. No.: 13/196,982

(22) Filed: Aug. 3, 2011

(65) Prior Publication Data

US 2012/0033712 A1 Feb. 9, 2012

(30) Foreign Application Priority Data

Aug. 5, 2010 (FR) ..................... 10 56451

(51) Int. Cl.
*G01K 7/02* (2006.01)
*G01K 7/16* (2006.01)
*G01K 1/14* (2006.01)
*G01D 11/30* (2006.01)

(52) U.S. Cl.
USPC .......... 374/208; 374/179; 374/163; 374/185; 73/866.5; 136/200

(58) Field of Classification Search
USPC ......... 374/141, 179, 208, 163, 183, 185, 100; 136/200; 73/866.5
See application file for complete search history.

(56) References Cited

U.S. PATENT DOCUMENTS

| | | | |
|---|---|---|---|
| 3,364,078 A | 1/1968 | Ekstrom, Jr. | |
| 3,901,080 A | 8/1975 | Hilborn | |
| 4,279,154 A * | 7/1981 | Nakamura | 136/221 |
| 4,355,911 A * | 10/1982 | Tymkewicz | 374/165 |
| 4,416,553 A | 11/1983 | Huebscher | |
| 5,061,083 A * | 10/1991 | Grimm et al. | 374/112 |
| 5,193,912 A * | 3/1993 | Saunders | 374/179 |
| 5,297,716 A * | 3/1994 | Smith et al. | 228/8 |
| 5,620,255 A * | 4/1997 | Cook, III | 374/141 |
| 5,746,513 A * | 5/1998 | Renken | 374/179 |
| 5,901,900 A * | 5/1999 | Finney | 228/173.5 |
| 6,040,518 A * | 3/2000 | Kinnard | 136/201 |
| 6,158,886 A * | 12/2000 | Dutcher et al. | 374/179 |
| 6,193,414 B1 * | 2/2001 | Balzano | 374/208 |
| 6,257,758 B1 * | 7/2001 | Culbertson | 374/120 |
| 6,491,413 B1 * | 12/2002 | Benesohn | 362/294 |
| 6,814,486 B2 * | 11/2004 | Sidoni | 374/208 |
| 7,419,299 B2 * | 9/2008 | Akram et al. | 374/137 |
| 7,789,555 B2 * | 9/2010 | Harcourt et al. | 374/147 |
| 8,162,541 B2 * | 4/2012 | Rose et al. | 374/183 |
| 2004/0037350 A1 * | 2/2004 | Parmicza et al. | 374/163 |
| 2006/0275933 A1 * | 12/2006 | Du Bois et al. | 438/14 |
| 2009/0041084 A1 * | 2/2009 | Sakami et al. | 374/179 |
| 2013/0259090 A1 * | 10/2013 | Schlipf | 374/179 |

OTHER PUBLICATIONS

Search report from counterpart French Application No. 1056451 Report dated Mar. 24, 2011.
European Search Report from corresponding European Patent Application No. 1117.5993; report dated Jul. 29, 2011.

* cited by examiner

*Primary Examiner* — Gail Verbitsky
(74) *Attorney, Agent, or Firm* — Miller, Matthias & Hull LLP

(57) ABSTRACT

A device for measuring the temperature of a substrate comprising a thermocouple comprising electric wires joined to each other at least one junction; a fixing element suitable for fixing said junction to said substrate in order to measure its temperature; characterized in that the fixing element comprises a thermally conductive element suitable for bearing a portion of electric wires adjacent to said junction; said thermally conductive element being capable of thermally coupling said portion of electric wires to said substrate.

17 Claims, 2 Drawing Sheets

DEVICE FOR MEASURING THE TEMPERATURE OF A SUBSTRATE

CROSS-REFERENCE TO RELATED APPLICATIONS

This application claims priority under the Paris Convention to the French Patent Application No. 10 56451, filed on Aug. 5, 2010.

FIELD OF THE DISCLOSURE

The invention relates to a device for measuring the temperature of a substrate, and in particular a device for measuring the temperature of a substrate which radiates in the infrared spectrum towards an external radiative environment when there is a great difference in temperature between the external radiative environment and said substrate.

BACKGROUND OF THE DISCLOSURE

One of the problems of the electronic-type payloads on board satellites in the space environment is dissipating the heat produced by the payload.

In the case, for example, of a telecommunications satellite, the payload frequently comprises travelling-wave tubes ("TWT"), intended to amplify the signal to be transmitted with very low background noise. Now, these travelling-wave tubes release a large quantity of heat which has to be dissipated in order to avoid a rise in temperature of the payload and of the TWT itself jeopardizing its correct operation. In the case of radiative TWTs, the collector is cooled down by means of an external radiator which radiates in the infrared spectrum directly towards a colder external radiative environment. The collector of these radiative travelling wave tubes can reach a temperature of the order of 200° C. depending on its operating mode, whereas the tube itself has a temperature of a few tens of ° C.

The heat dissipation ability of a travelling-wave tube is then an element determining the power of the payload.

Before launching the satellite, ground tests are carried out on the heat dissipation of the useful payload, in a test chamber in an environment simulating the conditions encountered in space, and in particular, with simulations of a very cold or very hot environment.

During these tests, the radiative travelling wave tubes are equipped with several temperature sensors and in particular thermocouple-type temperature sensors on the radiator. These sensors are fixed onto a metal plate with glue.

However, these sensors measure the surface temperature of the radiator with significant errors, typically 45° C. when the collectors of the travelling-wave tubes have a temperature of 150° C. in a test chamber at −50° C.: these errors result from the fact that the thermocouple measures its own temperature and that the temperature of the junction (or weld) of the thermocouple reaches equilibrium between the temperature of the substrate measured and the external radiative environment. The conductive leak in the thermocouple wires is the main contributor to the measuring error.

SUMMARY OF THE DISCLOSURE

The purpose of the present invention is to propose a device capable of accurately measuring the temperature of a substrate, and in particular of accurately measuring the temperature of a substrate which radiates in the infrared spectrum towards an external radiative environment when there is a great difference in temperature between the radiative environment and said substrate.

To this end, a subject of the invention is a device for measuring the temperature of a substrate comprising:
a thermocouple comprising electric wires joined to each other at least one junction;
a fixing element suitable for fixing said junction to said substrate in order to measure its temperature;
characterized in that the fixing element comprises a thermally conductive element suitable for bearing a portion of electric wires adjacent to said junction; said thermally conductive element being capable of bringing said portion of electric wires into thermal contact with said substrate, and in that said fixing element comprises a thermally conductive support suitable for bearing said junction, and in which the thermally conductive element comprises a flexible lug fixed to said support; said flexible lug being suitable for exerting a pressure on said junction, Advantageously, this measuring device makes it possible to keep a predefined length of the electric wires of the thermocouple situated close to the junction of the thermocouple produced by the weld, at a temperature close to the temperature of the substrate; the surface temperature of which is to be measured with the aim of limiting the conductive leak between the junction and the thermocouple wires.

Advantageously, this measuring device can be easily withdrawn from the radiator of the radiative travelling wave tubes, after the satellite's qualification ground tests.

Advantageously, this measuring device does not damage the collector of the radiative travelling wave tubes and, in particular, leaves no trace of glue on the latter.

Advantageously, this measuring device makes it possible to keep the fixing of the junction of the thermocouple against the radiator in an external radiative environment the temperature of which varies over a wide range of values.

Advantageously, this measuring device is compact, and it is moreover simple to utilize and to remove. In particular, it is capable of being fixed on a weak surface of the radiator of the radiative travelling wave tubes for the ground tests. Thus, it does not block, or only slightly blocks, the radiation of the radiator towards the external radiative environment allowing the cooling down of the collector of the tube. Consequently, this measuring device does not modify the environment of the radiator nor the thermal behaviour of the latter and thus makes it possible to measure a temperature which accurately reflects the temperature of the radiator for the ground tests with an error of less than approximately 3° C. When the satellite is sent into space, the radiative tubes will no longer include a thermocouple-type measuring device and their mechanical integrity will not be modified.

Advantageously, this measuring device can be used immediately after it is fixed to the substrate. The glue for fixing the junction to the measuring device need not be expected to polymerise, as the time for polymerization of the glue occurs during the manufacture of the measuring device.

Depending on the particular embodiments, the measuring device comprises one or more of the following characteristics:
said portion of electric wires has a length comprised between approximately 30 mm and approximately 70 mm,
the measuring device comprises a protective element capable of insulating said portion of electric wires from the external radiative environment,
said protective element is capable of fixing said portion of electric wires to said thermally conductive element, said protective element is made of a thermally conductive material in order to produce the conductive bridge between said portion of electric wires and said thermally conductive element, said protective element comprises an adhesive strip, said thermally conductive element is made of a material capable of insulating it from radiative exchanges with the external environment, in which at least a part of said thermally conductive element covers at least a part of said portion of electric wires in order to insulate them against said radiative exchanges with the external environment, said thermally conductive element comprises a projecting support element, said support element being suitable for bearing at least a part of said portion of electric wires, said thermally conductive material is made of a material chosen from aluminium, aluminium alloys, copper and copper alloys, the support is thermally coupled to the junction and the substrate, said support being electrically insulated from said junction by a glue, said flexible lug is bent at least twice, said flexible lug comprises a first lug part detachably fixed to the support and to the substrate, and a second lug part forming the support element, and the second lug part is surrounded by a flattened loop of electric wires and by said protective element in order to form a sheath having a homogeneous temperature.

BRIEF DESCRIPTION OF THE DRAWINGS

The invention will be better understood on reading the following description given by way of non-limitative example only, with reference to the drawings, in which.

DETAILED DESCRIPTION OF THE DISCLOSURE

Figure 1:
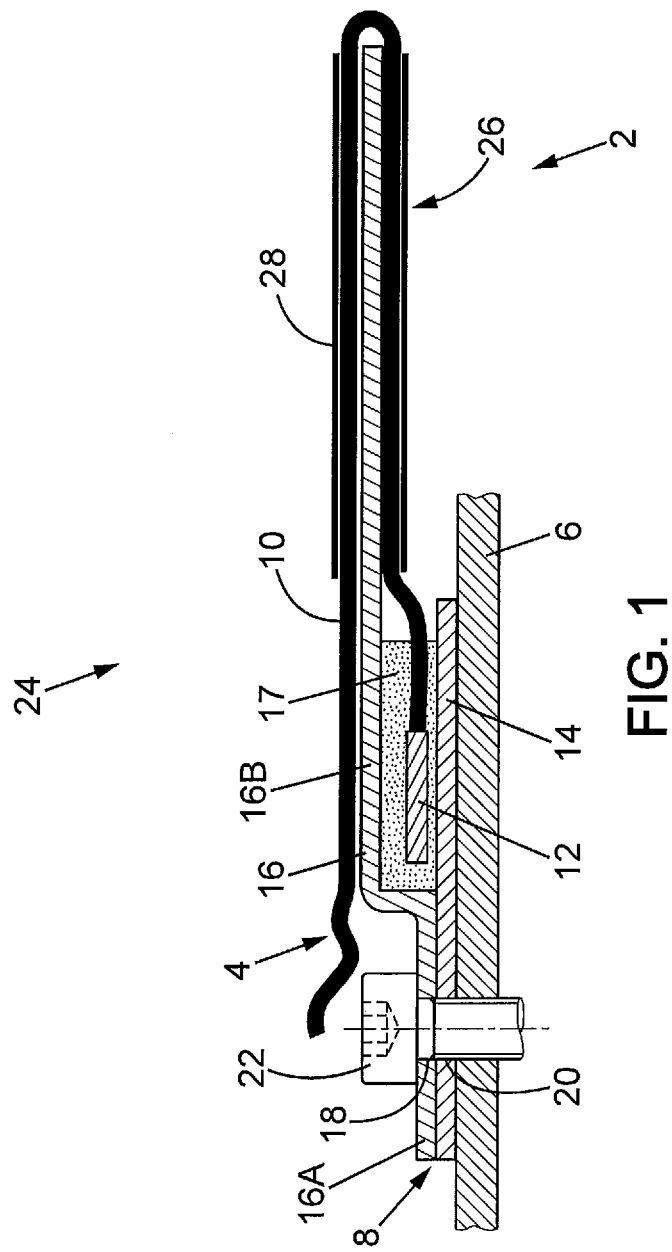
FIG. 1 is a diagrammatic cross-sectional view of a measuring device according to a first embodiment of the invention.
Figure 2:
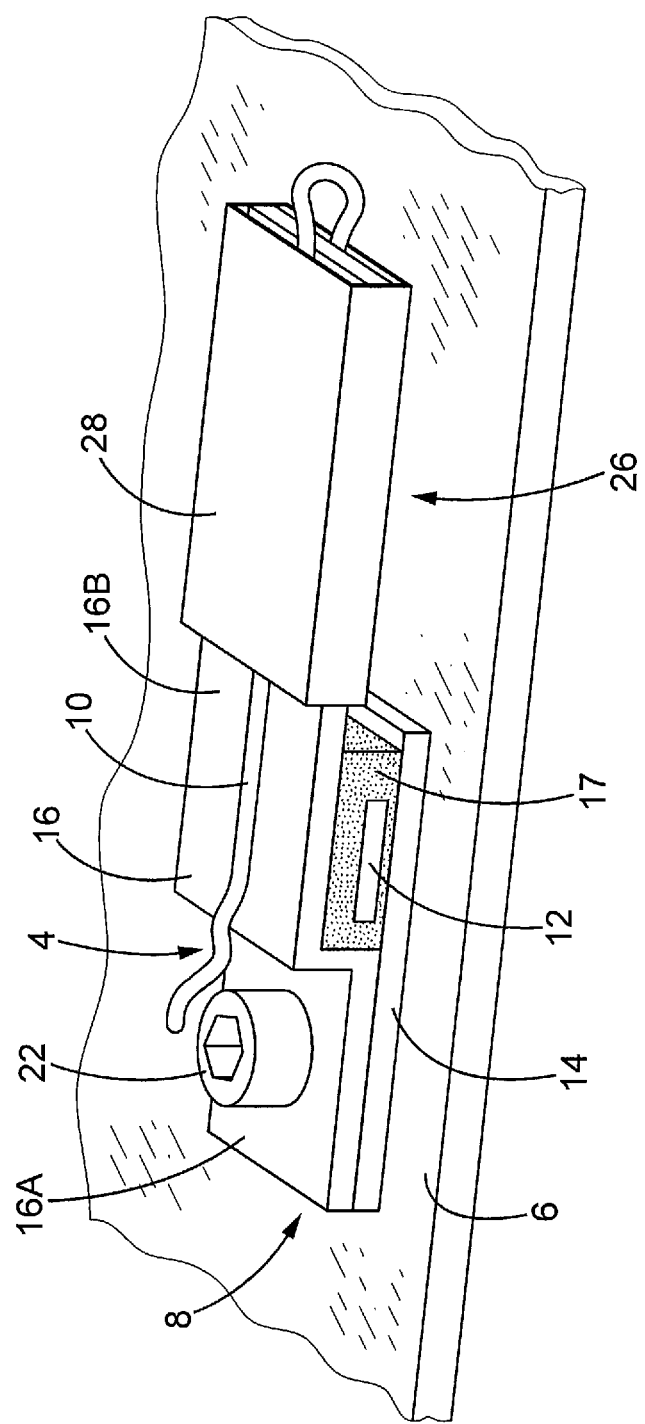
FIG. 2 is a diagrammatic perspective view of the measuring device illustrated in FIG. 1.

With reference to FIGS. 1 and 2, the measuring device 2 according to the first embodiment of the invention comprises a thermocouple 4 suitable for measuring the temperature of a substrate 6 and an element 8 for fixing part of the thermocouple 4 to said substrate 6.

The thermocouple 4, only partially shown, comprises two electric wires 10 the ends of which are connected to each other by two junctions. These electric wires 10 are made of different metals or metal alloys such as, for example, the pair of materials Copper and Constantan or the pair of materials Chromel and Alumel. The thermocouple 4 generates, by the Seebeck effect, a difference in potential which depends on the difference in temperature between the two junctions. In order to measure an unknown surface temperature, one of the two junctions is maintained at a known temperature, the other junction 12 produced by the weld being in contact with the surface of the substrate 6 the surface temperature of which is to be measured.

The substrate 6 is, for example, an element for cooling down electronic components, such as a radiative travelling-wave tube mounted on a satellite. The substrate 6 can be arranged in an external radiative environment the temperature of which varies within a very wide temperature range, typically between −173° C. up to approximately 130° C. such as, for example, in a test chamber.

The fixing element 8 is suitable for fixing the junction 12 to said substrate 6. To this end, the fixing element 8 comprises a support 14 suitable for bearing the junction 12, and a flexible lug 16 capable of bearing a portion of electric wires 10 adjacent to the junction.

The support 14 is, for example, constituted by a plate. The junction 12 is glued to the support 14 with electrically insulating and thermally conductive glue 17.

The support 14 is made of a thermally conductive material so that the junction 12 measures a temperature as close as possible to the temperature of the substrate 6. This material is, for example, aluminium, aluminium alloys, copper or copper alloys.

The flexible lug 16 is also made of a thermally conductive material. It therefore forms a thermally conductive element. It is in thermal contact with the substrate 6 in order to maintain the temperature of the portion of electric wires 10 as close as possible to the temperature of the substrate 6 and thus ensure an accurate measurement of the temperature of the substrate by limiting the conductive leak between the junction 12 and the portion of electric wires 10 adjacent to the junction 12.

According to the embodiment shown, the flexible lug 16 is in contact with the support 14 which is, itself, in contact with the substrate 6.

As a variant, the flexible lug 16 can be in direct contact with the substrate 6 (see FIG. 3). What is important here is to create a thermal link between the substrate 6 and the portion of electric wires 10 adjacent to the junction 12.

The support 14 and the flexible lug 16 are each passed through by an opening 18 and 20 respectively, passed through by a screw 22 capable of being screwed into the substrate 6 in order to fix the measuring device 2 to the substrate 6.

The flexible lug 16 is made of a material capable of protecting the portion of electric wires 10 situated between the substrate 6 and the flexible lug 16 from the radiative exchanges with the external environment. These radiative exchanges are diagrammatically represented, in FIG. 1, by an arrow 24.

The flexible lug 16 is bent twice so as to constitute a step below which the junction 12 is glued. Thus, the flexible lug 16 exerts a slight pressure on the junction 12 which helps to hold the latter against the support 14 and increases the conductive coupling between junction 12 and the support 14.

The flexible lug 16 comprises a support element 26 which projects beyond the support 14. This support element 26 is suitable for bearing the portion of electric wires 10.

More precisely, the flexible lug 16 comprises a first lug part 16A detachably fixed to the support 14 and to the substrate 6, two bends, and a second lug part 16B forming the support element 26.

Thus, advantageously, the surface of the substrate 6 facing the support element 26 remains a surface suitable for radiating towards the external radiative environment in order to cool down the substrate.

The portion of electric wires 10 is fixed around the support element 26 using an adhesive strip 28 wound around a flattened loop of electric wires surrounding the support element 26.

The adhesive strip 28 is smoothed using a tool, over the electric wires 10 in order to create a sleeve or a sheath suitable for resisting detachment in an extreme temperature environment. This smoothing makes it possible to remove air bubbles and avoid detachment of the adhesive strip 28 when the surrounding temperature is very high.

The adhesive strip 28 is made of a thermally conductive material, allowing radiative insulation with respect to the external environment and exhibiting low infrared emissivity, such as aluminium or an aluminium alloy. The smoothing also makes it possible to make the surface of the adhesive strip 28 reflective and reduce its infrared emissivity.

The portion of electric wires 10 borne by the flexible lug 16 has a length comprised between approximately 30 mm and approximately 70 mm.

The invention claimed is:

1. A device for measuring the temperature of a substrate comprising:
    a thermocouple comprising electric wires joined to each other at least one junction; and
    a fixing element for fixing said junction to said substrate in order to measure its temperature, wherein said fixing element comprises:
    a thermally conductive support bearing said junction; and
    a thermally conductive and flexible lug fixed to said support; said flexible lug bearing a portion of electric wires adjacent to said junction; said flexible lug bringing said portion of electric wires into thermal contact with said substrate; said flexible lug exerting a pressure on said junction, and in which said flexible lug is bent at least twice so as to constitute a step below which the junction is glued.

2. The measuring device according to claim 1, in which said portion of electric wires has a length comprised between approximately 30 mm and approximately 70 mm.

3. The measuring device according to claim 1, which comprises a protective element insulating said portion of electric wires from the external radiative environment.

4. The measuring device according to claim 3, in which said protective element fixes said portion of electric wires to said flexible lug.

5. The measuring device according to claim 3, in which said protective element is made of a thermally conductive material in order to produce the conductive bridge between said portion of electric wires and said flexible lug.

6. The measuring device according to claim 3, in which said protective element comprises an adhesive strip.

7. The measuring device according to claim 3, in which said protective element covers at least a part of said portion of electric wires in order to insulate them against said radiative exchanges with the external environment.

8. The measuring device according to claim 1, in which said flexible lug comprises a projecting support element, said support element bearing at least a part of said portion of electric wires.

9. The measuring device according to claim 1, in which said flexible lug is made of a material chosen from aluminium, aluminium alloys, copper and copper alloys.

10. The measuring device according to claim 1, in which the support is thermally coupled to the junction and the substrate, said support being electrically insulated from said junction by a glue.

11. The measuring device according to claim 8, in which said flexible lug comprises a first lug part detachably fixed to the support and to the substrate, and a second lug part forming the support element.

12. The measuring device according to claim 11, in which the second lug part is surrounded by a flattened loop of electric wires and by said protective element in order to form a sheath having a homogeneous temperature.

13. Measuring device according to claim 1, in which said flexible lug and said support are each passed through by an opening, the measuring device comprising a screw which passes though said openings; said screw passing through an opening of the substrate to detachably fix the measuring device to the substrate.

14. Measuring device according to claim 1, in which said flexible lug exerts a permanent pressure on said junction.

15. Device for measuring the temperature of a substrate comprising:
    a thermocouple comprising electric wires joined to each other at least one junction;
    a fixing element for fixing said junction to said substrate in order to measure its temperature, wherein said fixing element comprises:
    a thermally conductive support bearing said junction;
    a thermally conductive and flexible lug fixed to said support; said flexible lug bearing a portion of electric wires adjacent to said junction; said flexible lug bringing said portion of electric wires into thermal contact with said substrate; said flexible lug exerting a pressure on said junction; said flexible lug comprising a lug part which overhang the substrate; said lug part being suitable for bearing at least a part of said portion of electric wires.

16. A device for measuring the temperature of a substrate comprising:
    a thermocouple comprising electric wires joined to each other at least one junction; and
    a fixing element for fixing said junction to said substrate in order to measure its temperature, wherein said fixing element comprises:
    a thermally conductive support bearing said junction; and
    a thermally conductive and flexible lug fixed to said support; said flexible lug bearing a portion of electric wires adjacent to said junction; said flexible lug bringing said portion of electric wires into thermal contact with said substrate; said flexible lug exerting a pressure on said, and in which said flexible lug and said junction support are each passed through by an opening, the measuring device comprising a screw which passes through said openings; said screw passing through an opening of the substrate to detachably fix the measuring device to the substrate.

17. A device for measuring the temperature of a substrate comprising:
    a thermocouple comprising electric wires joined to each other at least one junction; and
    a fixing element for fixing said junction to said substrate in order to measure its temperature, wherein said fixing element comprises:
    a thermally conductive support bearing said junction;
    a thermally conductive and flexible lug fixed to said support; said flexible lug bearing a portion of electric wires adjacent to said junction; said flexible lug bringing said portion of electric wires into thermal contact with said substrate; said flexible lug exerting a pressure on said junction; said flexible lug comprising a projecting support element bearing at least a part of said portion of electric wires, a first lug part detachably fixed to the support and to the substrate, and a second lug part forming the support element; and
    a protective element insulating said portion of electric wires from the external radiative environment, wherein the second lug part is surrounded by a flattened loop of electric wires and by said protective element in order to form a sheath having a homogeneous temperature.

* * * * *